United States Patent [19]

Kobori et al.

[11] Patent Number: 4,613,914
[45] Date of Patent: Sep. 23, 1986

[54] AUTO-TRACKING METHOD AND APPARATUS OF A MAGNETIC RECORDING/REPRODUCING APPARATUS

[75] Inventors: Yasunori Kobori, Yokohama; Hideo Nishijima, Katsuta; Kaneyuki Okamoto, Katsuta; Isao Fukushima, Katsuta; Katsuhiko Goto, Mito; Takashi Takahashi, Katsuta, all of Japan

[73] Assignees: Hitachi Microcomputer Hitachi, Ltd.; Engineering, Ltd., both of Tokyo, Japan

[21] Appl. No.: 754,908

[22] Filed: Jul. 15, 1985

[30] Foreign Application Priority Data

Jul. 17, 1984 [JP] Japan ................. 59-146759

[51] Int. Cl.$^4$ ............................................. G11B 5/008
[52] U.S. Cl. .................................... 360/70; 360/10.2
[58] Field of Search .................... 360/10.1, 10.2, 10.3, 360/70, 77

[56] References Cited

FOREIGN PATENT DOCUMENTS 53-90910 8/1978 Japan .

Primary Examiner—George G. Stellar
Attorney, Agent, or Firm—Antonelli, Terry & Wands

[57] ABSTRACT

An auto-tracking method and apparatus of a helical scan type magnetic recording/reproducing apparatus wherein envelope levels of reproduced signals are detected and the running phase of a magnetic tape is controlled so that the envelope level of the reproduced signal becomes maximum after detection is effected roughly and then finely, thereby allowing a video head to scan a track on the magnetic tape.

9 Claims, 19 Drawing Figures

AUTO-TRACKING METHOD AND APPARATUS OF A MAGNETIC RECORDING/REPRODUCING APPARATUS

BACKGROUND OF THE INVENTION

The present invention relates to an auto-tracking method and apparatus of a magnetic recording/reproducing apparatus of the helical scan system and, more particularly, to an auto-tracking method and apparatus of the type such that the running phase of a magnetic tape is controlled so that the envelope level of the reproduced signal becomes maximum and thereby allowing a video head to scan a track on the magnetic tape.

Hitherto, in home-use magnetic recording/reproducing apparatuses (hereinafter, referred to as VTR) of the helical scan system, the tracking control is performed so that the video head accurately scans the track on the magnetic tape. As one of such tracking controls, there has been conventionally known a system in which the rotational phase of the capstan motor (accordingly, the running phase of the magnetic tape) is controlled such that the phase difference between the control signal reproduced from the magnetic tape and the reference signal generated in the VTR becomes a predetermined value.

On the other hand, conventional VTRs are generally constituted such that the reproducing modes in which the running speeds of the magnetic tape differ from each other can be selected, and ordinarily, the standard reproducing mode and the one-third-speed reproducing mode in which the running speed of the magnetic tape is slower than that in the standard reproducing mode can be selected.

However, in such VTRs, dedicated video heads are provided for each of those reproducing modes and also these dedicated video heads are arranged on the rotary cylinder at the positions which are deviated from one another. Thus, the relations between the rotational phases of the video heads in the best tracking state (namely, the state whereby the video heads are accurately scanning the tracks) and the phases of the control signals in those reproducing modes differ. In general, the rotational phase of the cylinder motor to rotate and drive the video heads is controlled by the reference signal which is common in the foregoing two reproducing modes, so that the rotational phase on the side of the video heads cannot be changed. Therefore, by controlling the reference signal to control the rotational phase of the capstan motor, namely, the running phase of the tape has to be made different between the above-mentioned respective reproducing modes.

Therefore, in such VTR, there is needed an auto-tracking apparatus which can also automatically control the phase of the reference signal to control the rotational phase of the capstan motor upon starting of the reproducing mode or in association with the switching between the standard reproducing mode and the one-third-speed reproducing mode.

As an example of such an auto-tracking apparatus, there has been known an auto-tracking apparatus in which a tracking control signal is detected using the envelope level of the reproduced signal and by using this control signal, the running phase of the magnetic tape is controlled so that the foregoing envelope level becomes maximum.

This auto-tracking apparatus uses the principle that, as shown in FIG. 1, the envelope level of the reproduced signal (hereinafter, referred to as a reproduction envelope level) generally changes with the change in the position of the video head in the direction of the width of the track on the magnetic tape (hereinbelow, this position is referred to as a tracking phase; it is assumed that when the central line of the video head coincides with the central line in the longitudinal direction of the track, the tracking phase is zero and that when the position of the video head is deviated by the track pitch (namely, the distance between the central lines of the adjacent tracks), the tracking phase is $2\pi$). This reproduction envelope level changes like a sine wave in such a manner that it becomes maximum when the tracking phase is $2n\pi$ and minimum when the tracking phase is $(2n-1)\pi$, wherein n is 0, 1, 2, . . . Therefore, if this reproduction envelope level is detected and the running phase of the tape is controlled in accordance with this level to change the tracking phase, the reproduction envelope level can be made maximum.

In the above-mentioned auto-tracking apparatus, the reproduction envelope level is periodically sampled and when there is a difference between the sampling value and the sampling value which has been detected immediately before, the running phase of the magnetic tape is changed such that the video head is moved by a predetermined amount in the direction of the width of the track, thereby changing the tracking phase. As shown in FIGS. 2(a) and 2(b), when the tracking phase is sequentially changed and the envelope level again increases, there is a tendency such that the sampling value also sequentially increases. The sampling value changes from the increasing state to the decreasing state at the turning point where the reproduction envelope level becomes maximum. That is, the auto-tracking apparatus automatically searches the tracking phase at which the sampling value changes from the increasing state to the decreasing state.

On the other hand, in such a conventional auto-tracking apparatus, to improve the accuracy in automatic search of the tracking phase, it is necessary to make small the change amount per one time of the running phase of the magnetic tape and thereby changing the tracking phase little by little. However in the case where the tracking phase is automatically searched by changing the tracking phase little by little as described above, the number of changes of the tracking phase until the maximum reproduction envelope level is derived, namely, the number of steps becomes extremely large, so that it takes long time to obtain the optimum tracking state. Particularly, in FIG. 1, the longest search time is necessary in case of searching from point A where the tracking phase at the start of the search is near 0° in the direction indicated by an arrow. As described above, there is a drawback such that when the tracking search time is long, it takes a long time (monitor cut time) from the start of the playback until the stable reproduced image is derived.

In addition, in the above-mentioned method known as an edge detecting method by which an envelope phase at which the envelope level starts changing from increasing to decreasing is searched, the following fatal problems are caused.

First, actually, the reproduction envelope level to the tracking phase does not accurately become like a sine wave as shown in FIG. 1 but has a small peak at the position where the tracking phase is near $(2n-1)\pi$ as shown in FIG. 3. This is because the noise is obtained from the video head in the worst tracking state wherein the video head is largely deviated from the track. If the peak occurs in this way, the reproduction envelope level obviously changes from the increasing state to the decreasing state, so that the apparatus erroneously recognizes that this wrong state is the best tracking state and this state is locked, and the state in which no playback image is obtained is held.

Second, the relation between the tracking phase and the reproduction envelope level is not determined on the one-to-one correspondence basis as shown in FIG. 1 or 3. When the reproduction envelope level is detected while making the tracking phase constant, this reproduction envelope level largely fluctuates. This fluctuation is caused due to a variation in contact state between the video head and the magnetic tape, or the like. As the result of the actual measurement, as shown in FIG. 4, the reproduction envelope level has a variation width indicated by the hatched portion. Therefore, in the case where the tracking phase is changed such that $t_1 \rightarrow t_2 \rightarrow t_3$, if the reproduction envelope level simply exhibits like a sine wave as shown in FIG. 1, the reproduction envelope level is obviously expected to be monotonously reduced; however, the reproduction envelope level changes such that $c_1 \rightarrow c_2 \rightarrow c_3$ and the level $c_1$ becomes the peak level, so that it is determined that the tracking state at the tracking phase of $t_2$ is the best state. On the other hand, even in case of changing the tracking phase such that $t_4 \rightarrow t_5 \rightarrow t_6$ as well, in spite of that the reproduction envelope level should monotonously increase, it becomes maximum at $c_5$ and it is decided that the tracking state at the tracking phase of $t_5$ is the optimum state.

As described above, the auto-tracking apparatus according to a conventional edge detecting method has drawbacks such that the search time becomes long and a malfunction occurs.

One example of a similar auto-tracking apparatus to the above-mentioned conventional auto-tracking apparatus is disclosed in Japanese Patent Unexamined Publication No. 53-90910.

SUMMARY OF THE INVENTION

It is an object of the present invention to provide an auto-tracking apparatus of a magnetic recording/reproducing apparatus in which the best tracking state can be certainly obtained with a high degree of accuracy in a short search time.

It is another object of the present invention to provide a method for effecting such auto-tracking operation.

To accomplish the above object, according to one aspect of the present invention, an auto-tracking apparatus of a magnetic recording/reproducing apparatus comprises: reference signal generating means for generating a reference signal; rotary cylinder driving means for rotating synchronously with the reference signal a rotary cylinder to which magnetic heads are attached; head switching signal generating means for detecting the rotational phase of the rotary cylinder and outputting a head switching signal representative of the detected rotational phase; reproduction signal envelope level detecting means for sampling and detecting the envelope level of the reproduced signals obtained by the magnetic heads at a timing relative to the head switching signal; tape running means for driving a magnetic tape at the phase difference designated with regard to the rotational phase of the magnetic heads; reference signal delay means for generating a delay reference signal to control the tape running means on the basis of the reference signal, in which the delay reference signal is is obtained by delaying the reference signal by an arbitrary time; and means for controlling the reference signal delay means on the basis of the head switching signal and the detected envelope levels of the reproduced signals in a manner that the reference signal delay means first changes the run of the magnetic tape at rough steps within a tracking phase range of $2\pi$ and thereby detecting the roughly searched maximum envelope level of the reproduced signals, and after completion of the rough search, changes the run of the magnetic tape at fine steps within a tracking phase range which is narrower than $2\pi$ and which includes the running phase of the magnetic tape corresponding to the roughly searched maximum envelope level and thereby detecting the fine searched maximum envelope level, and thereby allowing the magnetic tape to run at the phase corresponding to this finely searched maximum envelope level.

DESCRIPTION OF THE PREFERRED EMBODIMENTS

Embodiments of the present invention will now be described hereinbelow with reference to the drawings.

Figure 5:
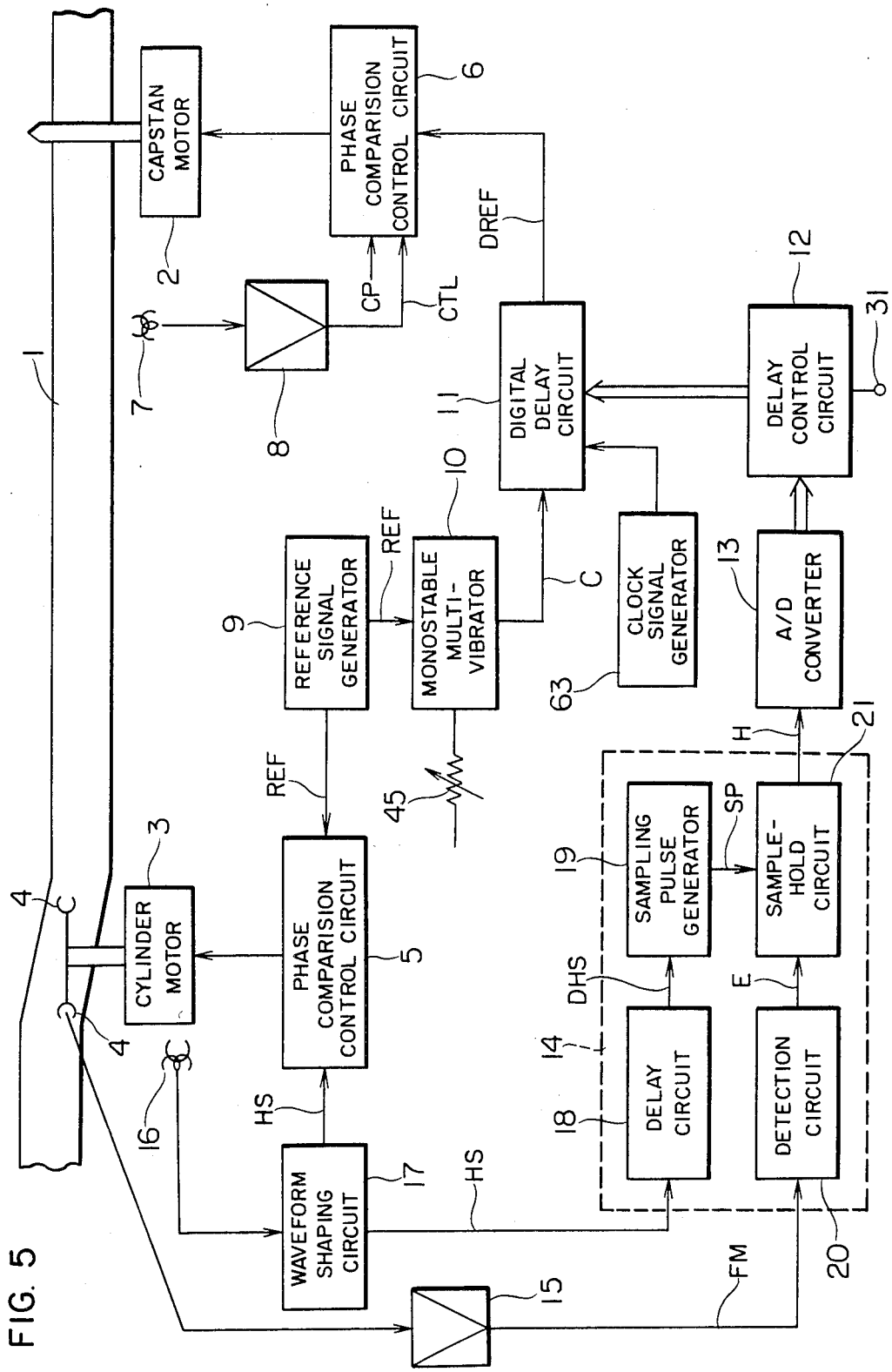
FIG. 5 is a block diagram showing one embodiment of an auto-tracking apparatus of a magnetic recording/reproducing apparatus according to the present invention.

FIG. 5 is a block diagram showing one embodiment of an auto-tracking apparatus of a magnetic recording-/reproducing apparatus according to the present invention. In the diagram, reference numeral 1 denotes a magnetic tape; 2 is a capstan motor; 3 a cylinder motor; 4 video heads; 5 and 6 phase comparison control circuits; 7 a control head; 8 an amplifier; 9 a reference signal generator; 10 a tracking monostable multivibrator; 11 a digital delay circuit; 12 a delay control circuit; 13 an A/D converter; 14 a sampling circuit; 15 an amplifier; 16 a rotational phase detector; 17 a waveform shaping circuit; 18 a delay circuit; 19 a sampling pulse generator; 20 a detection circuit; 21 a sample-hold circuit; 31 a terminal adapted to receive a search-start signal SS which is generated when the reproducing mode is started, or when a switching is performed between the standard reproducing mode and the one-third-speed reproducing mode, or when the level of the reproduced signal from the video head decreases below a predetermined level, or the like; 45 a variable resistor to control the pulse width of an output pulse of the multivibrator 10; and 63 a clock signal generator.

In FIG. 5, a pulse indicative of the rotational phase of the cylinder motor 16 which is obtained from the detector 16 is processed by the waveform shaping circuit 17, so that a head switching signal HS is formed. The signal HS is supplied to the phase comparison control circuit 5 and is phase compared with a reference signal REF from the reference signal generator 9. The phase difference signal between those signals is supplied to the cylinder motor 3. Thus, the motor 3 is rotated synchronously with the phase of the reference signal REF.

On the other hand, a control signal CTL recorded on the magnetic tape 1 is detected by the control head 7 and is amplified by the amplifier 8 and is supplied to the phase comparison control circuit 6 by which this signal is phase compared with a delay reference signal DREF from the digital delay circuit 11. A phase difference signal from the control circuit 6 is supplied to the capstan motor 2, so that the capstan motor 2 is controlled and driven such that the phase of the control signal CTL is synchronized with the phase of the delay reference signal DREF, thereby allowing the magnetic tape 1 to run.

Figure 6:
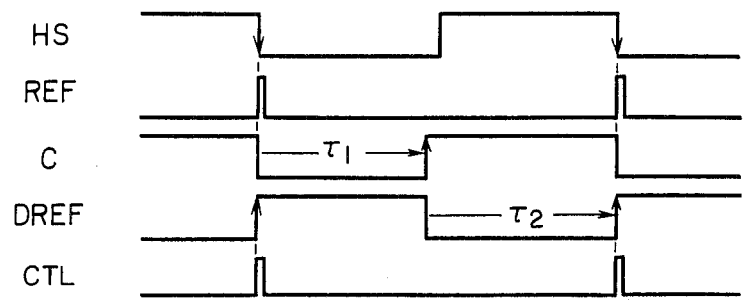
FIG. 6 is an explanatory diagram showing the phase of a reference signal for control of the rotational phase of a capstan motor in FIG. 5.

A method of forming the delay reference signal DREF will now be described with reference to FIG. 6.

The period of the reference signal REF which is generated from the reference signal generator 9 is equal to the rotational period of the cylinder motor 3. The reference signal REF is delayed by the time $\tau_1$ which is substantially ½ of the period of the signal REF by the tracking monostable multivibrator 10 and is further delayed by the digital delay circuit 11, so that the delay reference signal DREF is formed. A delay time $\tau_2$ of the digital delay circuit 11 is set by the delay control circuit 12 such that the optimum tracking state is obtained. Generally, as shown in FIG. 6, the delay time $\tau_2$ of the digital delay circuit 11 is set so that the trailing edge of the head switching signal HS coincides with the control signal CTL. A waveform C denotes an output of the multivibrator 10.

Such a digital delay time $\tau_2$ to realize the best tracking state is determined by searching the tracking phase such that the reproduction envelope level becomes maximum at the start point of the reproducing mode, or upon switching between the standard reproducing mode and the long-time reproducing mode, or the like. This searching operation is performed in such a manner that the tracking phase at which the reproduction envelope level becomes maximum is first detected by roughly changing the tracking phase within a predetermined range, for example, a range of 2 $\pi$ (rough search) and then the tracking phase at which the reproduction envelope level becomes maximum is detected by finely changing the tracking phase within a range near the above-mentioned tracking phase roughly derived (fine search). This change of the tracking phase can be accomplished by changing the delay time $\tau_2$ of the digital delay circuit 11 by the delay control circuit 12. The delay time $\tau_2$ of the digital delay circuit 11 to the tracking phase detected due to the fine search is the delay time to realize the foregoing best tracking state.

Figure 7:
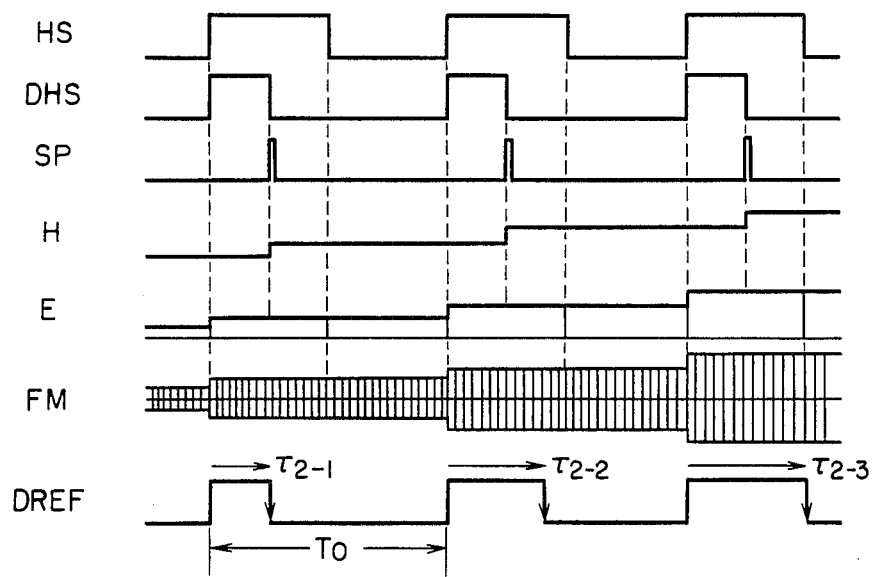
FIG. 7 is a waveform diagram showing a signal in each section during searching operation in FIG. 5.

Next, the rough search and fine search to set the delay time $\tau_2$ will be explained with reference to FIGS. 7 and 8.

The reproduced signal from the video head 4 is the FM video signal. This reproduced signal FM is amplified by the amplifier 15 and is supplied to the sampling circuit 14. The head switching signal HS derived by the waveform shaping circuit 17 is also supplied to the sampling circuit 14.

In the sampling circuit 14, the envelope of the reproduced signal FM is detected by the detection circuit 20 and this envelope voltage E is supplied to the sample-hold circuit 21. In addition, the head switching signal HS has the trailing edge which was delayed by the delay circuit 18 by ¼ of one period of the head switching signal with respect to the leading edge of the signal HS. Also, the leading edge of the signal HS is converted to a delayed head switching signal DHS which is simultaneous with the head switching signal HS and is supplied to the sampling pulse generator 19, so that a sampling pulse SP is formed. The video heads 4 consist of two heads. The timing of the sampling pulse SP which is generated by the sampling pulse generator 19 synchronously with the trailing edge of the head switching signal coincides with the timing at which one of those heads plays back and scans the intermediate portion of the track on the magnetic tape 1. Such a timing is for the reason that the maximum reproduced output can be ordinarily obtained in the intermediate portion of the track. The sampling pulse SP is supplied to the sample-hold circuit 21, by which the envelope voltage is sampled and held.

The envelope voltage H sampled by the sample-hold circuit 21 is supplied to the A/D converter 13, so that the digital value is obtained. This digital signal is supplied to the delay control circuit 12.

When the magnetic recording/reproducing apparatus is set to, for example, the reproducing mode and the search-start signal SS is applied to the terminal 31, the delay control circuit 12 starts operating. Thus, the rough search of the tracking phase is first performed and the fine search is then carried out.

In the rough search, each time a digitized sampling voltage (hereinbelow, simply referred to as a sampling value) from the A/D converter 13 is supplied, the delay control circuit 12 roughly changes the delay time $\tau_2$ of the digital delay circuit 11. Therefore, the delay reference signal DREF changes its delay time $\tau_2$ sequentially to $\tau_{2-1}, \tau_{2-2}, \tau_{2-3}, \ldots$ each time when the cylinder motor 3 rotates one turn. In association with this change, the tracking phase changes and the envelope level of the reproduced signal FM also varies. In this case, the delay time $\tau_2$ of the digital delay circuit 11 is changed within a range corresponding to the tracking phase changes of 2 $\pi$ (namely, as much as one track pitch).

At the same time, each time when the sampling value is supplied, the delay control circuit 12 compares this sampling value with the sampling value which has been supplied immediately before and detects the delay time $\tau_2$ of the digital delay circuit 11 corresponding to the sampling value which becomes maximum during the time when the tracking phase changes by 2 $\pi$ and then holds this detected delay time $\tau_2$.

Figure 8:
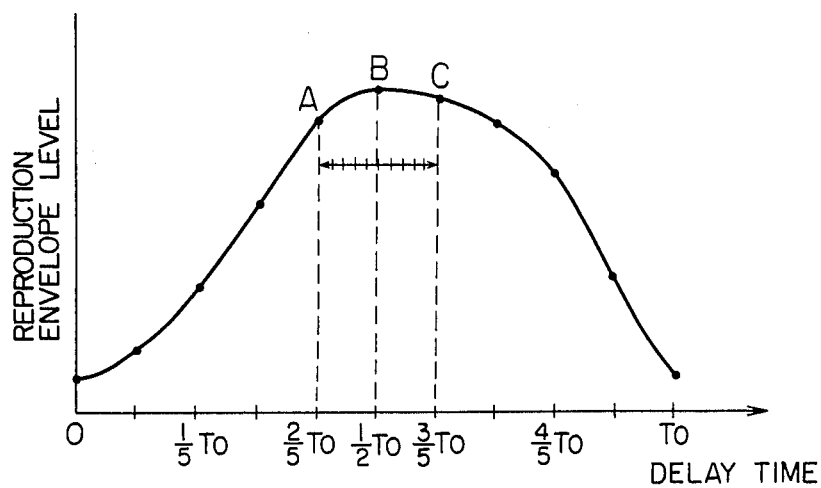
FIG. 8 is a graph showing an example of the relation between the delay time of digital delay circuit during searching operation in FIG. 5 and the reproduction envelope level.

FIG. 8 shows the change of the reproduced envelope level with the delay time $\tau_2$ of the digital delay circuit 11 in such rough search, in which the ordinate indicates the reproduced envelope level and the abscissa represents the delay time $\tau_2$. It is assumed that a change amount of the delay time $\tau_2$ of the digital delay circuit 11 necessary to change the tracking phase by 2 $\pi$ is $T_0$, in this rough search, and that each time when the sampling value is supplied to the delay control circuit 12, the delay time of the digital delay circuit 11 changes by $T_0/10$ at a time. Therefore, the points indicated by small circles in FIG. 8 denote the sampling values which are supplied to the delay control circuit 12.

After completion of the rough search in this way, the fine search is then performed.

In this fine search, each time when the sampling value is supplied from the A/D converter 13 to the delay control circuit 12 within a predetermined range around the delay time $\tau_2$ of the digital delay circuit 11 corresponding to the maximum reproduction envelope level detected by the rough search, the delay time $\tau_2$ of the digital delay circuit 11 is changed little by little, and the delay time $\tau_2$ of the digital delay circuit 11 which delay time gives the maximum reproduction envelope level within the predetermined range is searched. This delay time $\tau_2$ is the delay time which should be set into the digital delay circuit 11 to obtain the best tracking state.

It is now assumed that the delay time of the digital delay circuit 11 when the reproduction envelope level becomes maximum due to the rough search is $T_0/2$ (point B) in FIG. 8. In the fine search, the delay time $\tau_2$ of the digital delay circuit 11 is changed little by little (for example, $T_0/100$ at a time) during the time from the delay time $2T_0/5$ to $3T_0/5$ corresponding to $\pm 1$ step in the rough search. In the delay control circuit 12, each time when the sampling value is supplied from the A/D converter 13, this sampling value is compared with the sampling value which has been supplied immediately before, thereby finding out the delay time $\tau_2$ which gives the maximum sampling value (therefore, the maximum reproduction envelope level).

Figure 1:
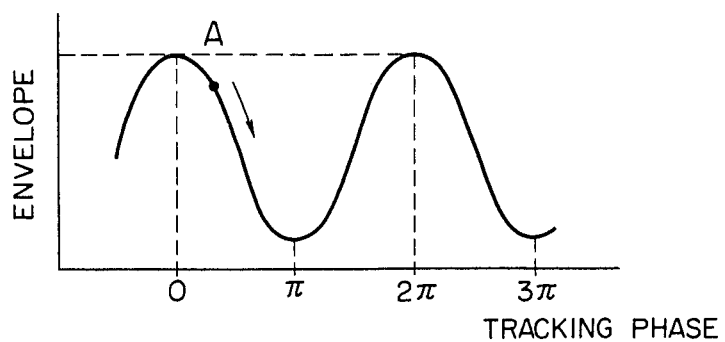
FIG. 1 is a diagram showing the relation between the tracking phase and the reproduction envelope level.
Figure 2:
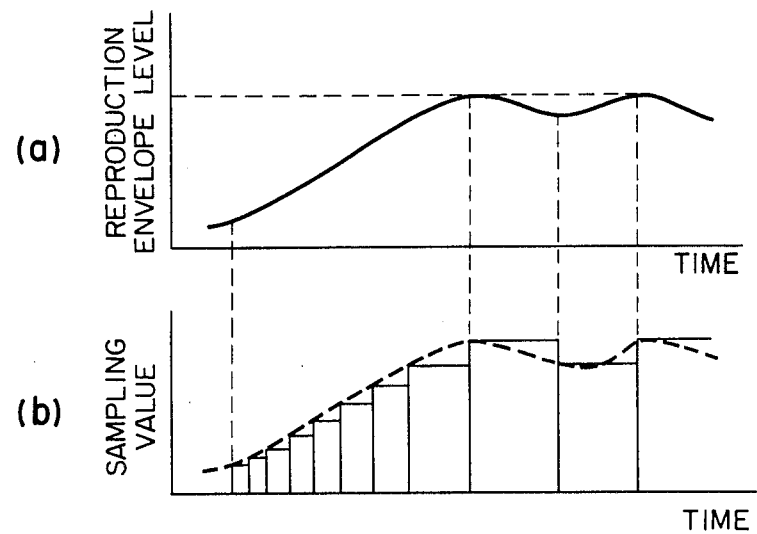
FIG. 2, consisting of FIGS. 2(a) and 2(b), is an explanatory diagram showing the change in sampling value to the change in reproduction envelope level.
Figure 3:
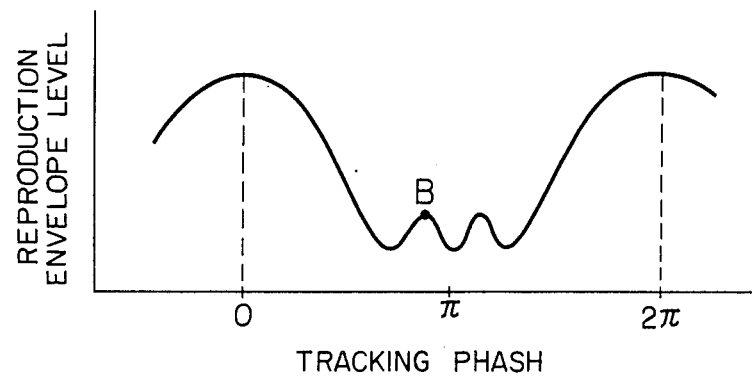
FIGS. 3 and 4 are diagrams for explaining a cause of the malfunction of the search of the tracking phase in an auto-tracking apparatus of a conventional magnetic recording/reproducing apparatus.
Figure 4:
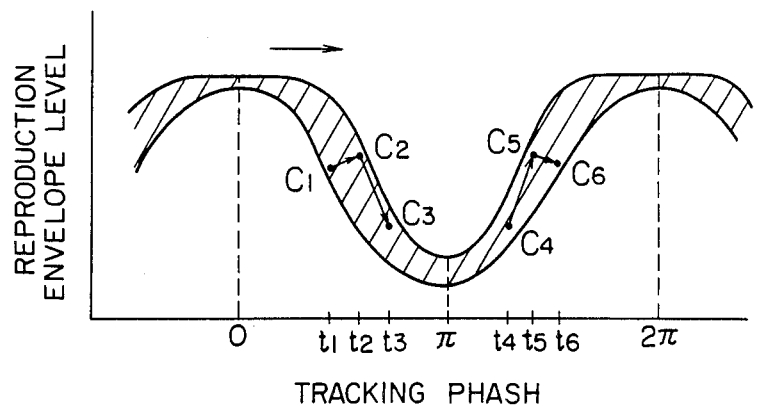

As described above, the schematic tracking phase at the maximum reproduction envelope level is first searched by the rough search and further the tracking phase at which the best tracking state is obtained is detected by the fine search. Therefore, the tracking phase can be rapidly searched. Also, a degree of accuracy in setting of the best tracking state can be raised. In the foregoing example, the accuracy of $\pm T_0/200$ is derived and this accuracy corresponds to about $\pm 1.8°$. In addition, the problems explained in FIGS. 3 and 4 can be also solved and the erroneous searching operation can be prevented.

Figure 9:
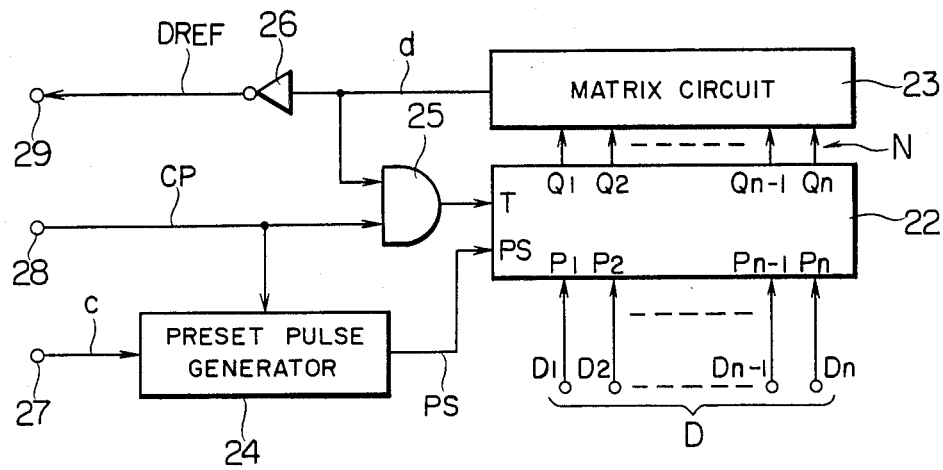
FIG. 9 is a block diagram showing a practical example of the digital delay circuit in FIG. 5.
Figure 10:
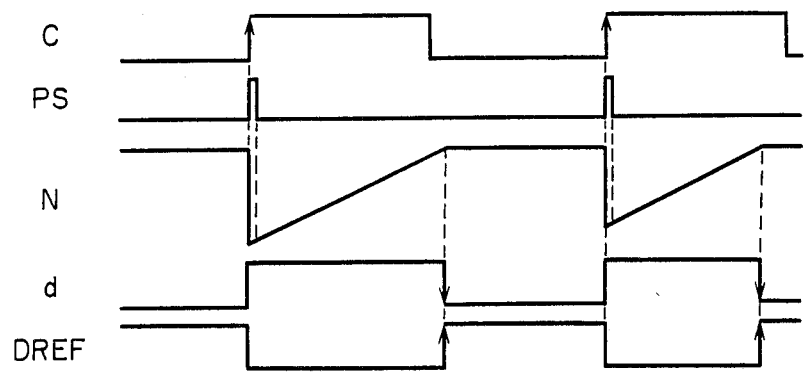
FIG. 10 is a diagram which is useful for explanation of the circuit of FIG. 9.

FIG. 9 is a block diagram showing a practical example of the digital delay circuit 11 in FIG. 5. FIG. 10 is a waveform diagram for explaining the operation of the circuit in FIG. 9. In FIG. 9, numeral 22 denotes a delay counter; 23 is a matrix circuit; 24 a preset pulse generator; 25 an AND gate; 26 an inverter; 27 and 28 input terminals; and 29 an output terminal.

In FIGS. 9 and 10, an output signal c of the tracking monostable multivibrator 10 (FIG. 5) is supplied to the input terminal 27. The output signal c is digitally differentiated by the preset pulse generator 24, so that a preset pulse PS is formed. An example of the preset pulse generator will be explained later with reference to FIG. 11.

On the other hand, n-bit preset data ($D_1, D_2, \ldots, D_{n-1}, D_n$) (where, $D_n$ is the most significant bit) is supplied to the delay counter 22 from the delay control circuit 12 (FIG. 5). Each time the preset pulse PS is supplied to the delay counter 22, the delay counter 22 is preset to the value D of this preset data (hereinafter, referred to as a preset value). When all bits $Q_1, Q_2, \ldots, Q_{n-1}, Q_n$ of an output value N of the delay counter 22 are "1", the matrix circuit 23 detects this and sets the level of an output signal d to "L". In other cases, the matrix circuit 23 sets the level of the output signal d to "H".

When the delay counter 22 is preset to a certain preset value in response to the preset pulse PS, the output signal d of the matrix circuit 23 becomes an "H" level because all bits of this preset value are ordinarily not "1". Thus, a clock pulse CP from the clock signal generator 63 in FIG. 5 is supplied from the input terminal 28 through the AND gate 25 to the delay counter 22. The delay counter 22 counts this clock pulse CP. When all bits $Q_1$ to $Q_n$ of the output value N of the delay counter 22 become "1", the output signal d becomes "L" and the AND gate 25 is turned off, so that the delay counter 22 stops counting.

When the next preset pulse PS is supplied to the delay counter 22 and this delay counter is preset, the output signal d of the matrix circuit 23 becomes "H", thereby allowing the delay counter 22 to start counting. The output signal d of the matrix circuit 23 is inverted by the inverter 26 and is supplied from the output terminal 29 as the delay reference signal DREF to the phase comparison control circuit 6.

In this way, the delay reference signal DREF is delayed from the leading edge of the signal c of the input terminal 27 by the time interval which starts from the presetting of the delay counter 22 and ends when all bits $Q_1$ to $Q_n$ of the output value N of the delay counter 22 become "1". Consequently, by changing a preset value D of the delay counter 22, the delay time $\tau_2$ of the delay reference signal DREF can be changed.

Assuming that the preset value of the delay counter 22 is M and the period of the clock signal CP is $T_{cp}$, the delay time $\tau_2$ is expressed by the following equation.

$$\tau_2 = (2^n - M - 1) \times T_{cp}$$

Therefore, by changing the preset value M, the delay time $\tau_2$ varies and the phase of the delay reference signal DREF changes, causing the tracking phase to be changed. In association with this, the reproduction envelope level also changes as shown in FIG. 8. The change of the preset value M is made large during the rough search and the change of the preset value M is made small during the fine search, so that the best tracking phase is detected and thereafter the preset value M at that time is fixed.

Figure 11:
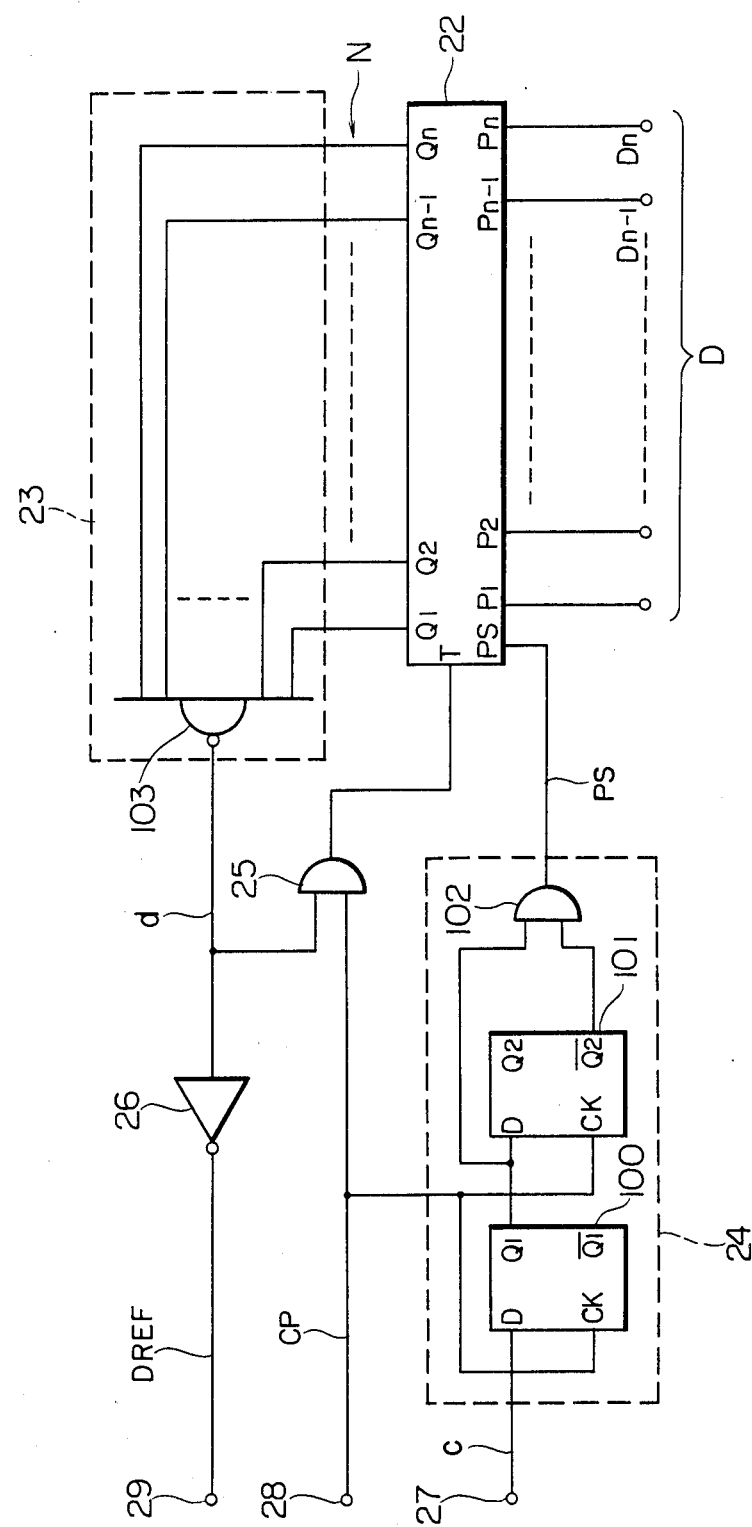
FIG. 11 is a diagram showing an example of a practical circuit arrangement of the digital delay circuit FIG. 9.

FIG. 11 shows the whole digital delay circuit in which the delay counter 22, matrix circuit 23 and preset pulse generator 24 shown in the block diagram of the digital delay circuit of FIG. 9 were replaced by practical circuits. In FIG. 11, the similar parts and components as those shown in FIG. 9 are designated by the same reference numerals. In FIG. 11, the preset pulse generator 24 is constituted by D flip flops 100 and 101 and an AND gate 102. The clock pulse CP generated by the clock pulse generator 63 is supplied to the terminal 28 and is inputted to CK terminals of the D flip-flops 100 and 101. A $Q_1$ output of the D flip-flop 100 becomes a high level in response to the leading edge of the clock pulse CP supplied after the output signal c of the multivibrator 10 (FIG. 5) supplied to the terminal 27 had risen. This high level $Q_1$ output is supplied to a D-input terminal of the D flip-flop 101. A $\overline{Q_2}$ output of the D flip-flop 101 changes from a high level to a low level in response to the leading edge of the next clock pulse. When both of the $Q_1$ output of the D flip-flop 100 and the $\overline{Q_2}$ output of the D flip-flop 101 are at a high level, an output of the AND gate 102, which receives the $Q_1$ and $\overline{Q_2}$ outputs, becomes high and this high level signal becomes the preset pulse PS.

The matrix circuit 23 is formed by a NAND circuit which receives outputs $Q_1$ to $Q_n$ of the delay counter 22.

Next, the delay control circuit 12 is explained with reference to FIGS. 12, 13A and 13B.

Figure 12:
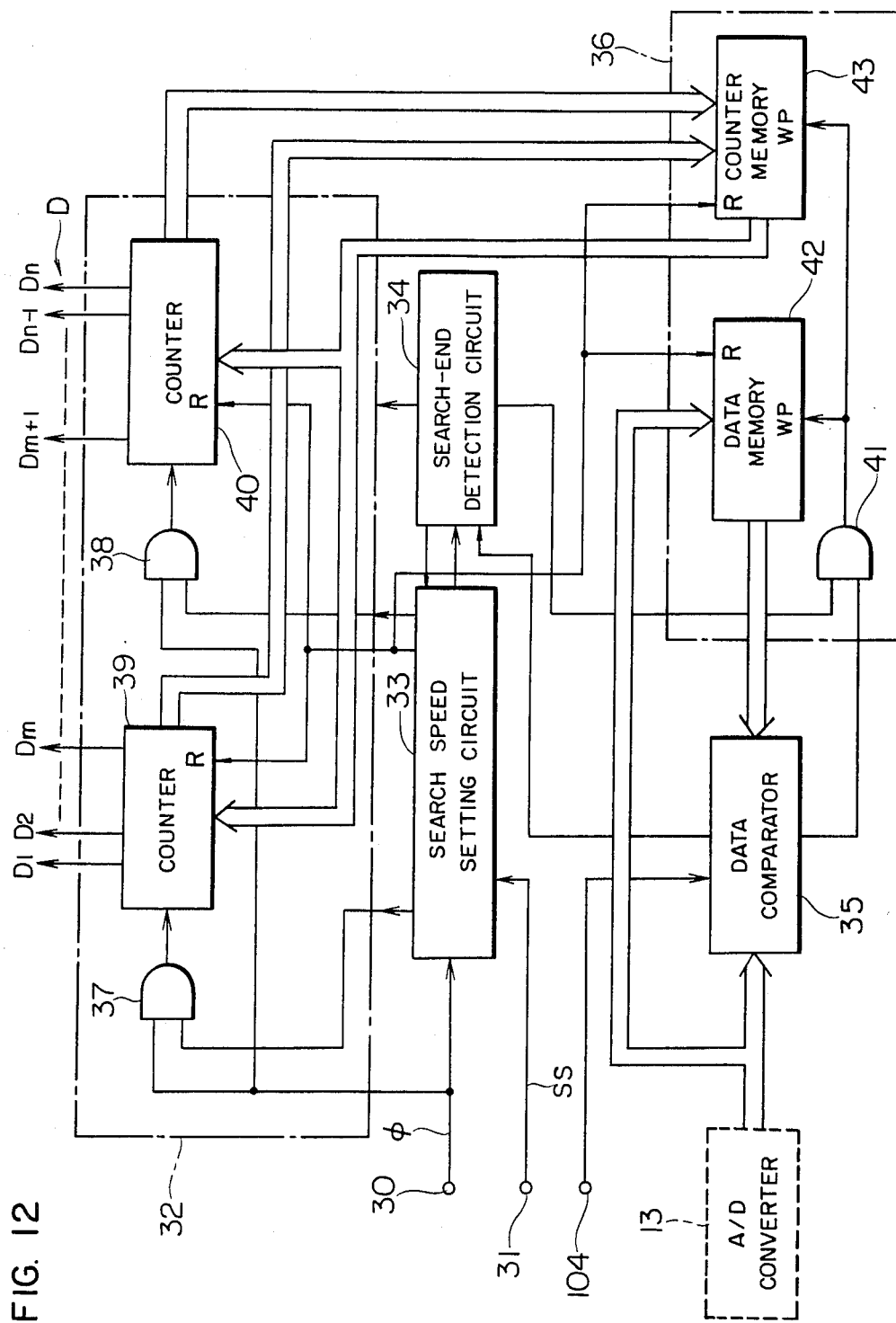
FIG. 12 is a block diagram showing a practical example of a delay control circuit in FIG. 5.

FIG. 12 is a block diagram showing a practical example of the delay control circuit 12 in FIG. 5. In this diagram, reference numerals 30 and 31 are input terminals; 32 a counter circuit; 33 a search speed setting circuit; 34 a search-end detection circuit; 35 a data comparator; 36 memory means; 37 and 38 AND gates; 39 a front stage counter; 40 a post stage counter; 41 an AND gate; 42 a data memory; 43 a counter memory; and 104 an input terminal, which is not used in this embodiment but is used in another embodiment of FIG. 15 which will be explained later.

Figure 13A:
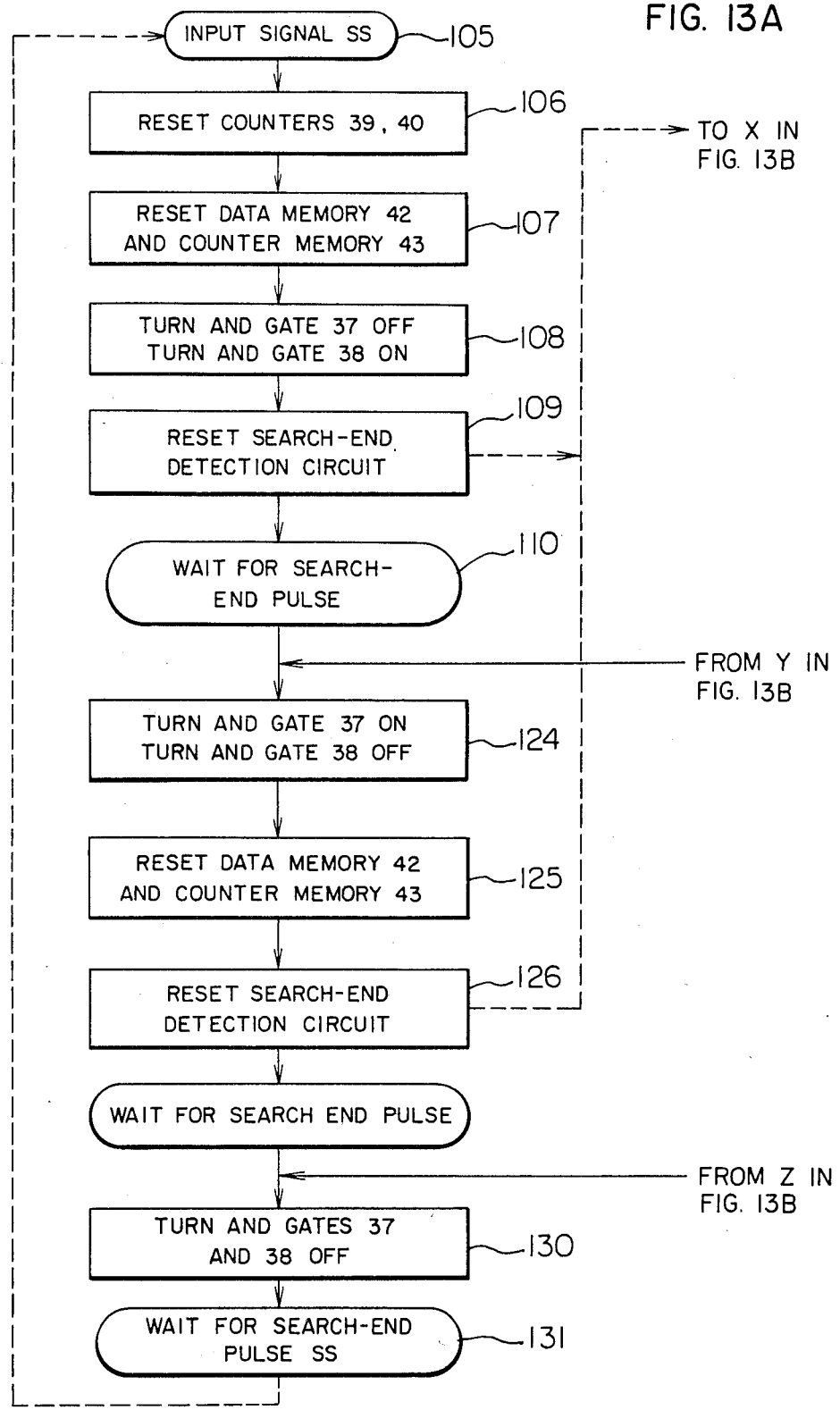
FIGS. 13A and 13B are flow charts showing the operation of the circuit of FIG. 12.
Figure 13B:
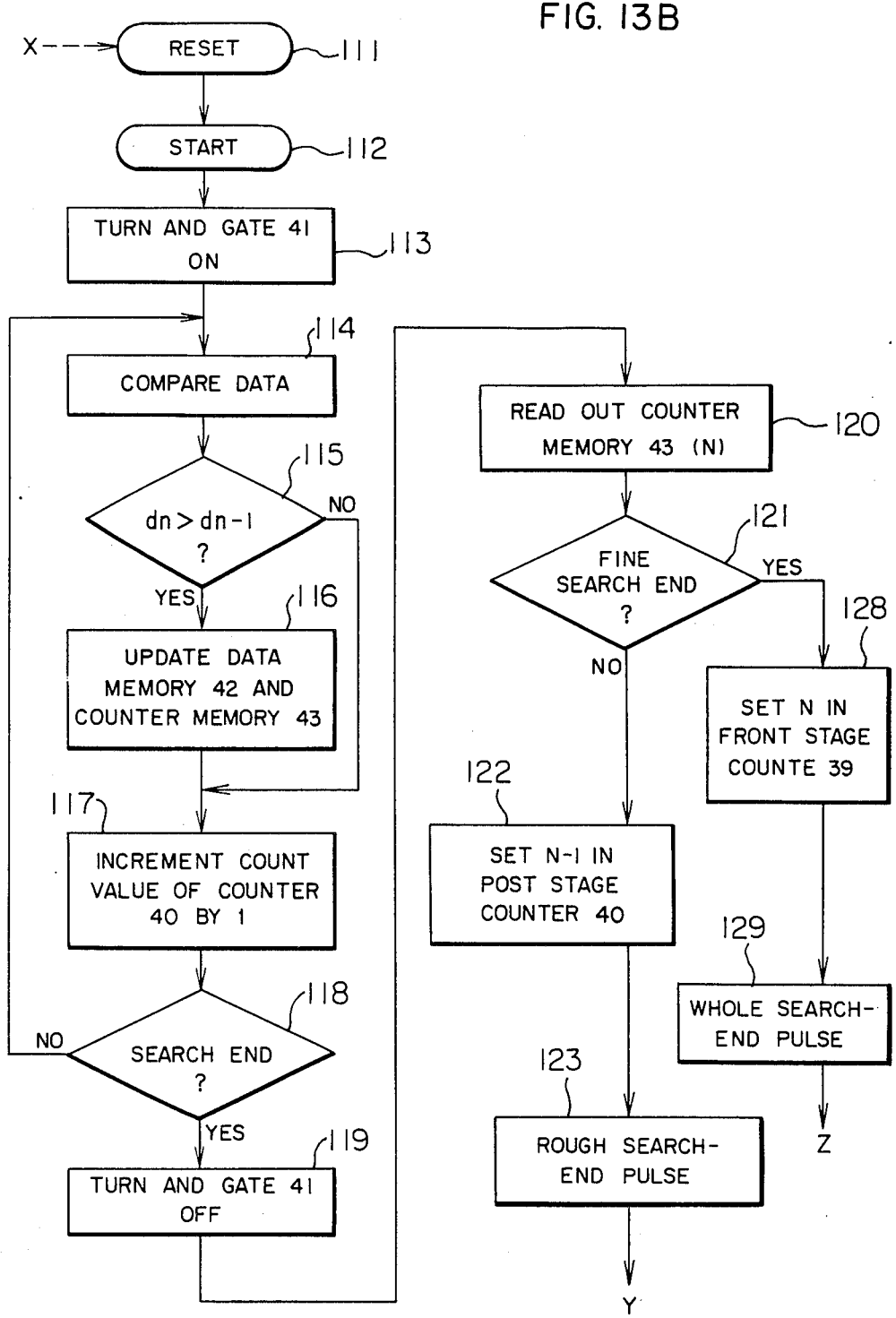

FIGS. 13A and 13B are programs for the circuits 33 and 34, respectively, when they are constituted by microcomputers.

In FIG. 12, a clock pulse $\phi$ is supplied from the input terminal 30 and the search-start signal SS is supplied from the input terminal 31. For example, the clock pulse $\phi$ is formed from the head switching signal HS (FIG. 5) and has a period equal to the rotational period of the cylinder motor 3 (FIG. 5). Namely, each time the reproduction envelope level is sampled by the sampling circuit 14 (FIG. 5), one clock pulse $\phi$ is supplied from the input terminal 30 one by one.

The front stage counter 39 and post stage counter 40 in the counter circuit 32 generate the preset value D of the delay counter 22 in FIG. 9. The post stage counter 40 generates the higher significant $(n-m)$ bits from $D_{m+1}$ to $D_n$ among all bits of the preset value D, while the front stage counter 39 generates the lower significant m bits from $D_1$ to $D_m$. The clock pulse $\phi$ is supplied from the input terminal 30 through the AND gate 38 to the post stage counter 40. However, each time the AND gate 37 is closed and, accordingly, each time the clock pulse $\phi$ is supplied to only the post stage counter 40, the preset value D changes by the value required to change the delay time $\tau_2$ by one step (namely, $T_0/10$ as shown in FIG. 8) of the digital delay circuit 11 (FIG. 5) in the rough search. On one hand, the clock pulse $\phi$ is supplied through the AND gate 37 to the front stage counter 39. However, each time the AND gate 38 is closed and, accordingly, each time the clock pulse 100 is supplied to only the front stage counter 39, the preset value D changes by the value required to change the delay time by one step ($T_0/100$ in the foregoing explanation) of the digital delay circuit 11 in the fine search.

In operation, when the reproducing mode is started or in the case where the switching is performed between the long-time reproducing mode and the standard reproducing mode, if the reproduction signal level from the video head decreases to a level below a predetermined level or the like due to some reasons during the playback operation, a search-start signal generator supplies the search-start signal SS to the search speed setting circuit 33 (a step 105) through the input terminal 31, and the delay control circuit 12 starts operating.

First, the front stage counter 39 and post stage counter 40 and also the data memory 42 and the counter memory 43 are reset to a value of zero (steps 106 and 107). Then, the search speed setting circuit 33 turns off the AND gate 37 and turns on the AND gate 38 (a step 108). In addition, a reset start signal is supplied from the setting circuit 33 to the search-end detection circuit 34 to reset it (a step 111) and to activate it (a step 112). As a result, the detection circuit 34 turns on the AND gate 41 (a step 113). From this moment, the rough search is started. Simultaneously, the search speed setting circuit 33 is brought into a waiting state for a rough search end pulse to be explained later (a step 110).

The first sampling value from the A/D converter 13 is necessarily stored in the data memory 42 (a step 116) because it is compared with the value representing zero (steps 114 and 115). The next sampling value from the A/D converter 13 is supplied to the data comparator 35 and is compared with the sampling value stored in the data memory 42 (the steps 114 and 115). Simultaneously, one clock pulse $\phi$ is supplied from the input terminal 30 through the AND gate 38 to the post stage counter 40, so that the value of the counter 40 is increased by "1" (a step 117). When the sampling value from the A/D converter 13 is larger than the sampling value stored in the data memory 42, the data comparator 35 generates a pulse and this pulse is supplied through the AND gate 41 to the data memory 42 and counter memory 43, thereby setting these memories into the writable states. Thus, the data memory 42 stores the sampling value from the A/D converter 13 in place of the previously stored sampling value, while the counter memory 43 stores the value held in the post stage counter 40 in place of the previously stored value. When the sampling value from the A/D converter 13 is equal to or smaller than the sampling value stored in the data memory 42, a write-pulse is not generated from the data comparator 35. Thus, the writing into the data memory 42 and counter memory 43 is not performed and the stored values are held as they are, respectively.

As described above, each time the sampling value is supplied from the A/D converter 13, this sampling value is compared with the sampling value stored in the data memory 42 by the data comparator 35 (the step 115). Each time this comparison is made, one clock pulse $\phi$ is supplied from the input terminal 30 to the post stage counter 40 (a step 117). Only when the sampling value $d_n$ from the A/D converter 13 is larger than the sampling value $d_{n-1}$ stored in the data memory 42, the sampling value to be stored in the data memory 42 is rewritten (a step 116), and at the same time the value in the counter memory 43 is also rewritten to the value of the post stage counter 40 at that time. Consequently, the maximum sampling value among the sampling values supplied from the A/D converter 13 so far is always stored in the data memory 42. The value of the post stage counter 40 when this maximum sampling value was supplied from the A/D converter 13 is stored in the counter memory 43.

When the tracking phase is changed by only $2\pi$, that is, when the delay time of the digital delay circuit 11 is changed from 0 to $T_0$ as shown in FIG. 8, the rough searching operation is finished (a step 118). The maximum sampling value derived due to this rough search is stored in the data memory 42. The value held in the post stage counter 40 when this sampling value was supplied from the A/D converter 13 is stored in the counter memory 43. This value is the value at point B in FIG. 8.

The end of the rough search is detected by counting times of data comparison by the search-end detecting circuit 34 after the supply of the search-start signal SS. The search-end detection circuit 34 turns off the AND gate 41 (a step 119). Under control of the detection circuit 34, the value stored in the counter memory 43 is read out (a step 120) and following to the step 120, the detection circuit 34 determines whether or not the fine search has been completed (a step 121), and if not, the read out value minus "1" is set into the post stage counter 40 (a step 122). When the vaue is set into the counter 40 in this way, as the preset value D by the front stage counter 39 holding zero and post stage counter 40 holding the count value of the counter memory 43, the delay time of $2T_0/5$ at point A in FIG. 8 is set into the digital delay circuit 11.

Next, the search-end detection circuit 34 supplies a search end pulse to the search speed setting circuit 33 (a step 123), so that the search speed setting circuit 33 turns on the AND gate 37 and turns off the AND gate 38. Further, both the data memory 42 and the counter memory 43 are reset again (a step 126) and the fine search is started. Simultaneously, the search speed setting circuit 33 is brought into a waiting state for a whole search end pulse representative of completion of both rough and fine search to be sent from the search-end detection circuit 34 (a step 127). The fine searching operation is similar to the operation in the rough search excluding that the clock pulse $\phi$ is supplied through the AND gate 37 to the front stage counter 39 and the value consisting of the $D_1$ to $D_m$ bits of the counter 39 changes, while the value stored so far in the counter memory 43 is rewritten to the value held in the counter 39 in accordance with the comparison result of the data comparator 35 as mentioned above. Thus, the fine search operation is carried out through the above-mentioned steps 111–121.

In this case, the value of the post stage counter 40 is fixed and only the value of the front stage counter 39 is changed. Thus, the value D generated by the counters 40 and 39 changes by a small value, at a time, which is smaller than that during rough search each time the clock pulse $\phi$ is supplied to the counter 39. In this particular embodiment, the value D changes in such a manner that the delay time of the digital delay circuit 11 changes by $T_0/100$ at a time.

This fine search is performed such that the delay time of the digital delay circuit 11 changes within a range of $T_0/2 \pm T_0/10$, namely, a range from $2T_0/5$ (point A) to $3T_0/5$ (point C) in FIG. 8. The maximum sampling value in this range is stored in the data memory 42. The value of the counter 39 when this sampling value was supplied from the A/D converter 13 is held in the counter memory 43.

Upon detection completion of the fine search by the search-end detection circuit 34 (a step 118), the AND gate 41 is turned off (a step 119) and the value of the front stage counter 39 is rewritten to the value held in the counter memory 43 (a step 128). The search-end detection circuit 33, responsive to a search-end pulse generated thereafter, will generate the search end pulse (a step 129) to turn off the AND gates 37 and 38. Then, the search speed detection circuit 33 is again brought into a waiting state for the search start signal SS (a step 131).

When the values of the counters 39 and 40 are respectively set due to the foregoing search, the delay time of the digital delay circuit 11 is set by the value D at this time such that the envelope level of the reproduced signal FM (FIG. 5) becomes maximum.

In the foregoing embodiment, as shown in FIG. 8, the rough search is started from the state in which the reproduction envelope level is minimum for convenience of the explanation. However, by properly setting the time constant of the tracking monostable multivibrator 10, as shown in FIG. 13, the rough search can be started from the state of a fairly large reproduction envelope level (for example, within a range of $\pm 90°$ of the tracking phase where the maximum envelope level is derived) near the point where the reproduction envelope level becomes maximum. This method is more preferable rather than that in the foregoing embodiment.

Figure 14:
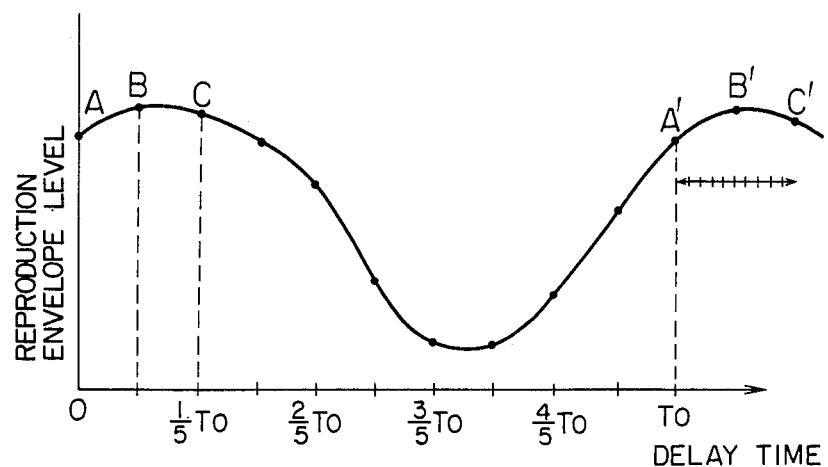
FIG. 14 is a graph showing the relation between the delay time outputted by the digital delay circuit in FIG. 5 during searching operation and the reproduction envelope level.

As will be obvious from FIG. 14, the apparatus is in a relatively good tracking state in which the reproduction envelope level is high at the time near the end of the rough search, and the reproduced image of a relatively good picture quality with less noise is derived. Even if the fine search is then performed, the reproduced picture quality hardly deteriorates but the search is performed so that the reproduced picture quality is further improved. Therefore, there is an advantage such that the user can feel that the search time is shorter than the actual time.

Further, as shown in FIG. 14, by setting such that the rough search is started from the state at point A which is one step before point B at which the maximum reproduction envelope level is obtained, the rough search is finished in the state at point A' that is substantially equal to the state at point A. Therefore, in the post stage counter 40 (FIG. 12), the fine search can be executed while keeping the value as it is at the end of the rough search. There is no need to shift the value from the counter memory 43 (FIG. 12) to the post stage counter 40 after completion of the rough search. Consequently, as shown in FIG. 8, as compared with the case where the rough search is performed, not only the user feels such that the search time is short as mentioned above but also the actual search time is reduced. On one hand, in this case, there is no need to perform the writing operation of the value of the post stage counter 40 into the data memory 43 upon rough search, so that the circuit arrangement of the delay control circuit 12 is also simplified.

Moreover, in the delay control circuit 12 shown in FIG. 12, the AND gate 38 is held in the ON state during the interval of the rough search, while the AND gate 37 is held in the ON state during the interval of the fine search. However, by suitably setting the relation between the timing of the comparing operation of the data comparator 35 and the supply timing of the clock pulse $\phi$ from the input terminal 30, a signal is made to be sent to the search speed setting circuit 33 from the data comparator 35 each time the data comparator 35 compares two sampling values, so that in the rough search, the AND gate 38 is turned on for every constant interval each time the data comparator 35 compares two sampling values and that in the fine search, the AND gate 37 is similarly turned on for every constant interval in order to turn on the AND gates 38 and 37 only for the interval which is substantially equal to the interval at which the clock signal $\phi$ is supplied from the input terminal 30. Due to this, it is possible to prevent that undesirable noise pulses are supplied to the post stage counter 40 or front stage counter 39.

The foregoing search speed setting circuit 33 and the search end detection circuit 34 may be realized by discrete circuit.

The phase comparison control circuit 6 to control the rotational phase of the capstan motor 2 in the embodiment of FIG. 5 will now be explained with reference to FIG. 15.

Figure 15:
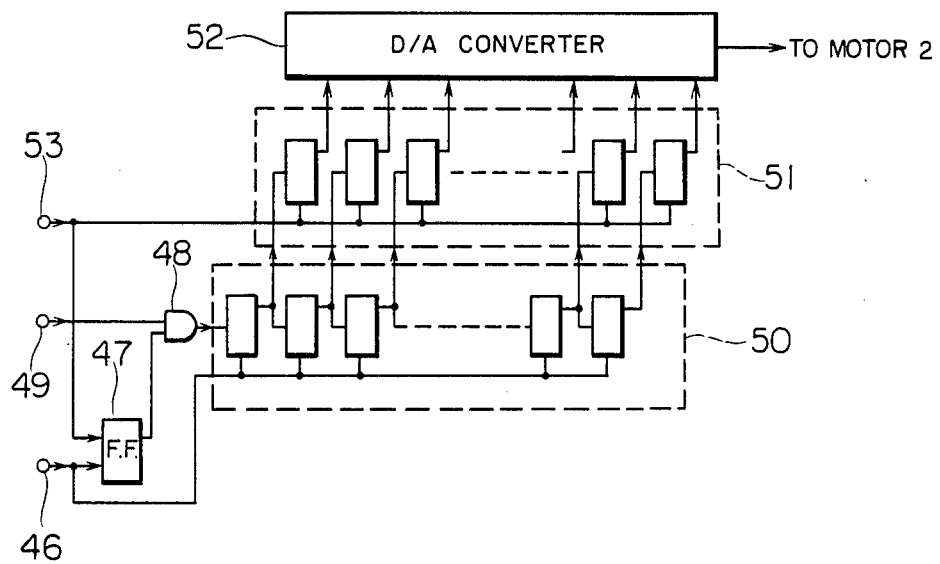
FIG. 15 is a diagram showing an example of a practical circuit arrangement of a phase comparison control circuit 6 in the embodiment of FIG. 5.

FIG. 15 is a block diagram showing an example of the phase comparison control circuit 6. In this diagram, a terminal 46 receives the delay reference signal DREF and is connected to one input of a flip-flop 47 and to a reset input of a counter 50. An output of the flip-flop 47 is connected to one input of an AND gate 48. A terminal 49 receives the clock pulse signal CP from the clock signal generator 63 and is connected to the other input of the AND gate 48. An output of the AND gate 48 is connected to an input of the counter 50. An output of the counter 50 is connected to an input of a latch 51. An output of the latch 51 is connected to an input of a D/A converter 52. An output of the D/A converter 52 is connected to a control input of the capstan motor 2. A terminal 53 receives the control signal CTL from the amplifier 8 and is connected to the other input of the flip flop 47 and to a latch input of the latch 51.

In operation, the digital information (count value of a binary number) of the counter 50 is latched by the latch 51 in response to the control signal CTL. Further, the output of the latch 51 is added to the D/A converter 52. An analog converted output corresponding to the digital information of the latch 51 is derived from the D/A converter 52.

The AND gate 48 is provided in the input of the counter 50. The opening and closure of this gate are controlled by the output of the flip flop 47 which is alternately inverted in response to the control signal CTL and delay reference signal DREF. Further, the delay reference signal DREF is added as a reset pulse of the counter 50.

According to the foregoing circuit arrangement, the counter 50 is reset by the input of the delay reference signal DREF and simultaneously the flip-flop 47 is inverted, causing the AND gate 48 to be opened. Therefore, the clock pulse CP is inputted to the counter 50 and the count number starts from the reset state. When the control signal CTL is latched by the latch 51, the count number of the counter 50 is taken in the latch 51, and at the same time the flip-flop 47 is inverted and the AND gate 48 is closed, so that the counter 50 is stopped. Thus, the interval from the generation of the delay reference signal DREF until the generation of the control signal CTL is counted by using the clock pulse. The analog value responsive to this count value is outputted from the D/A converter 52 and the capstan motor 2 is controlled by this output signal so as to be rotated synchronously with the phase of the delay reference signal DREF.

Figure 16:
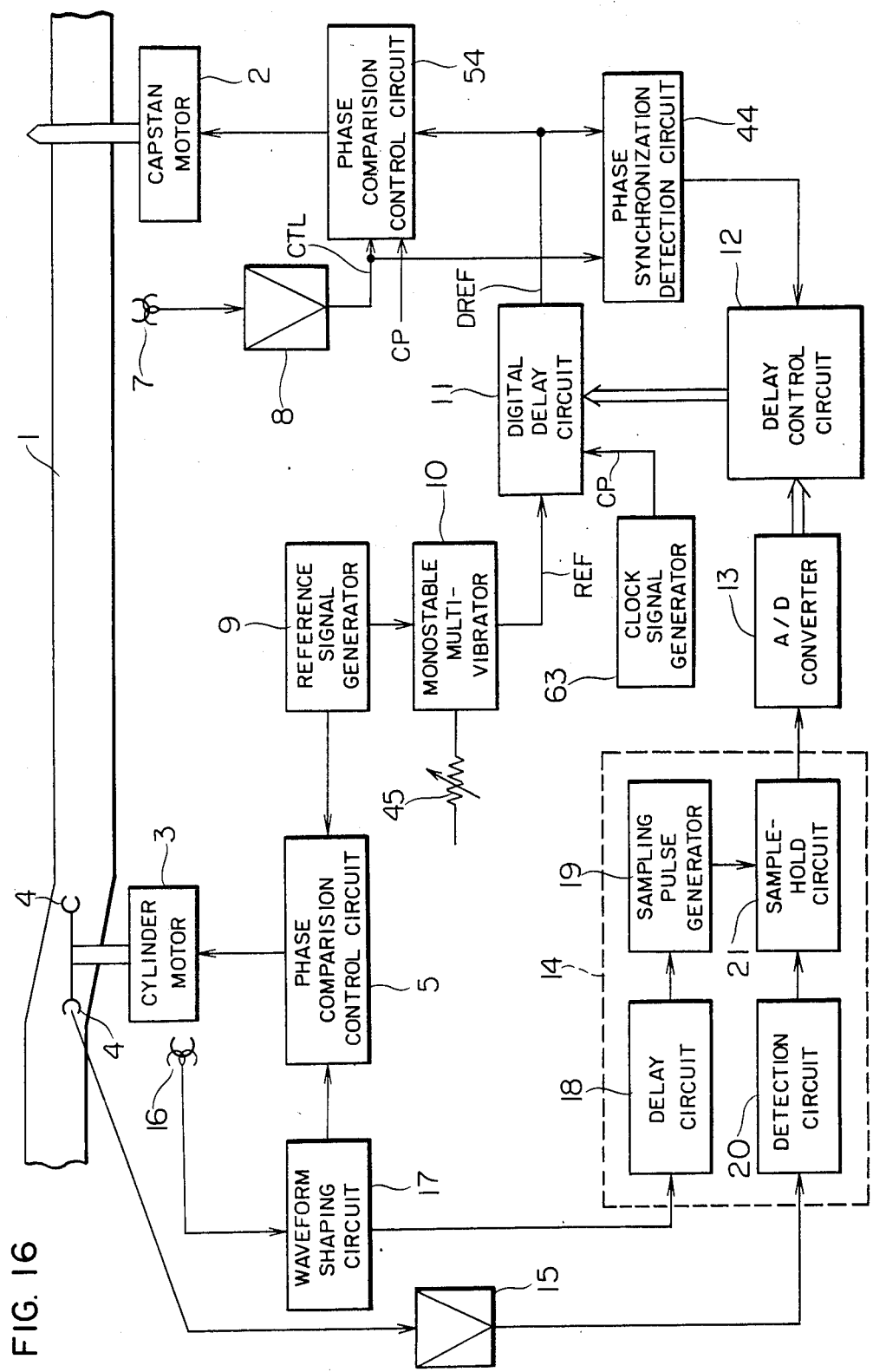
FIG. 16 is a block diagram showing another embodiment of an auto-tracking apparatus of a magnetic recording/reproducing apparatus according to the present invention.

FIG. 16 is a block diagram showing another embodiment of an auto-tracking apparatus of a magnetic recording/reproducing apparatus according to the present invention, in which a numeral 44 denotes a phase synchronization detection circuit and its output is connected to a terminal 104 of the delay control circuit 12, and 54 is a phase comparison control circuit. In FIG. 16, the similar parts and components as those shown in FIG. 5 are designated by the same reference numerals and their detailed descriptions are omitted.

In the embodiment of FIG. 5, explanation has been made such that each time the reference signal REF is delayed by the digital delay circuit 11 during the rough search, the rotational phase of the capstan motor 2, namely, the running phase of the magnetic tape 1 instantaneously follows the phase of the delay reference signal DREF. However, when the phase of the delay reference signal DREF changes, it takes a certain time from this time point until the relation between the phase of the signal DREF and the running phase of the magnetic tape 1 becomes a predetermined stationary relation. Although no problem will be caused if this certain time is sufficiently shorter than the rotational period of the cylinder motor 3, there is also a possibility that the certain time becomes almost equal to or longer than this rotational period. When the delay control circuit 12 performs the rough searching operation within such certain time, this means that the searching operation was executed with respect to the erroneous reproduction envelope level.

Such a problem is not so serious in the case where the running amount of the magnetic tape 1 per one rotation of the cylinder motor 3 is small such as during the search in the one-third-speed reproducing mode in which the running speed of the magnetic tape 1 is slow or during the fine search wherein the change of the delay time $\tau_2$ of the digital delay circuit 11 is small, or the like. However, this problem becomes serious during the rough search in the standard reproducing mode in which the running speed of the magnetic tape 1 is high.

The embodiment shown in FIG. 16 solves such problem. In this embodiment, the phase synchronization detection circuit 44 is provided and the phase relation with the delay reference signal DREF from the digital delay circuit 11 is detected, and when this phase relation is not the predetermined stationary relation, the searching operation by the delay control circuit 12 is temporarily stopped by the control signal CTL from the amplifier 8, and when such a relation becomes the predetermined stationary relation, the searching operation is again performed.

For this purpose, when the delay time $\tau_2$ of the digital delay circuit 11 changes by the delay control circuit 12 during the search and the phase relation between the control signal CTL and the delay reference signal DREF is deviated from the predetermined stationary relation, the searching operation is temporarily interrupted and during this time interval, the delay time $\tau_2$ of the digital delay circuit 11 is held as it is. Thereafter, when the foregoing phase relation becomes the predetermined stationary relation, the phase synchronization detection circuit 44 detects this and thereby allowing the searching operation by the delay control circuit 12 to be started and causing the delay time $\tau_2$ of the digital delay circuit 11 to be changed.

The control to make the delay control circuit 12 operative or inoperative by the output signal of the phase synchronization detection circuit 44 is performed in the following manner.

Namely, in FIG. 12, assuming that the rough search is now being performed, the AND gate 38 will be in the ON state and the data comparator 35 will be in the comparison operating state. However, when the detection circuit 44 (FIG. 16) detects that the phase relation between the control signal CTL and the delay reference signal DREF is deviated from the predetermined stationary relation, the output signal of the detection circuit 44 is supplied to the data comparator 35, so that the comparator 35 is made inoperative. In association with this, a command signal is sent from the data comparator 35 to the search speed setting circuit 33, so that the AND gate 38 is turned off. Thus, the delay control circuit 12 is stopped and the rough searching operation is interrupted.

Next, when it is detected by the phase synchronization detection circuit 44 that the phase relation between the control signal CTL and the delay reference signal DREF became the predetermined stationary relation, the inoperative state of the data comparator 35 is released in response to an output signal of the detection circuit 44 at this time, so that the search speed setting circuit 33 turns on the AND gate 38. Due to this, the delay control circuit 12 restarts the searching operation.

As described above, in this embodiment, the searching operation is executed in the interval excluding the interval when the phase relation between the control signal CTL and the delay reference signal DREF is deviated from the predetermined stationary relation. Thus, it is possible to search the delay time $\tau_2$ of the digital delay circuit 11 when the reproduction envelope level accurately becomes maximum (accordingly, the tracking phase).

Figure 17:
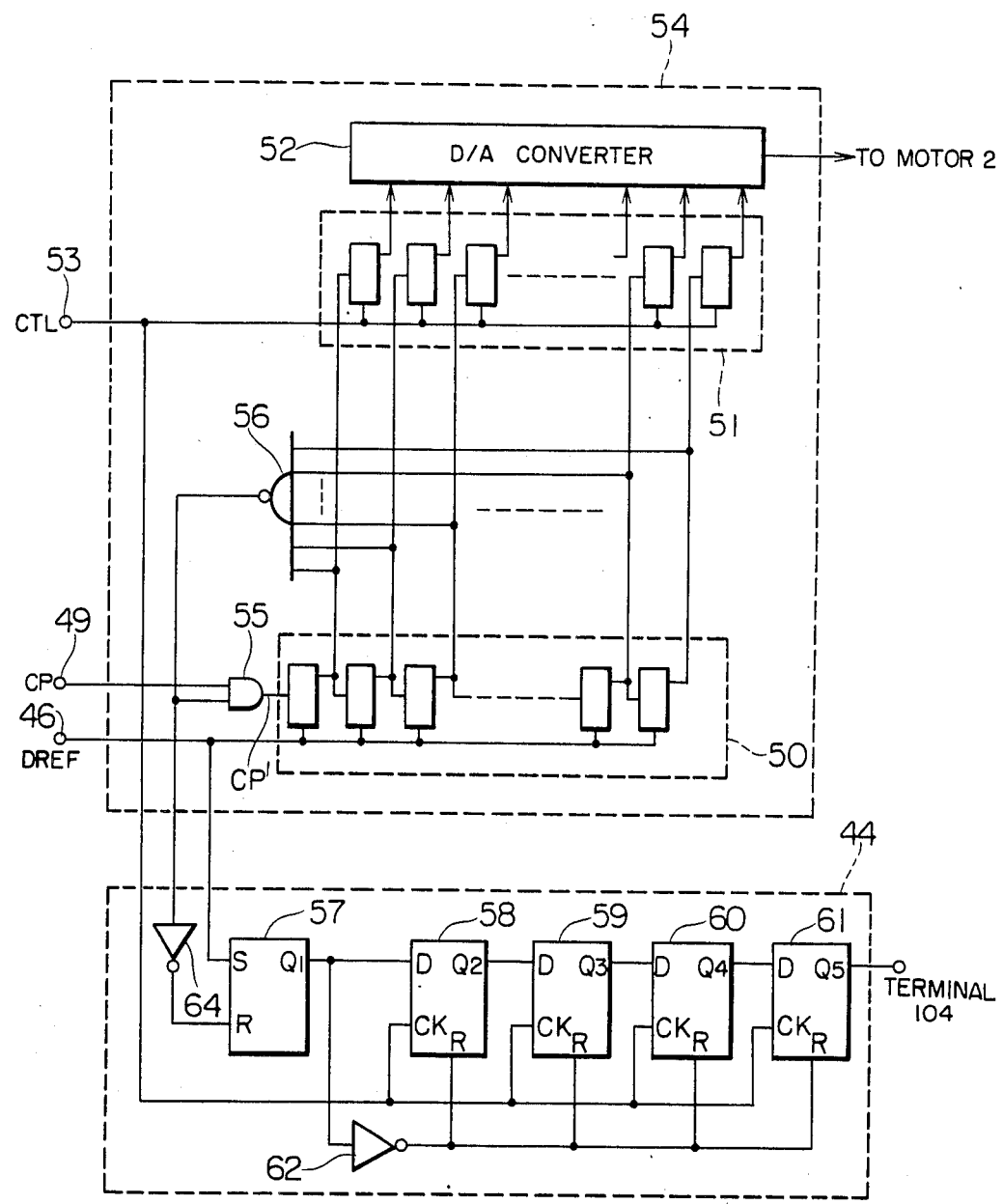
FIG. 17 is a diagram showing an example of a practical circuit arrangement of a phase synchronization detection circuit 44 in the embodiment of FIG. 16.
Figure 18:
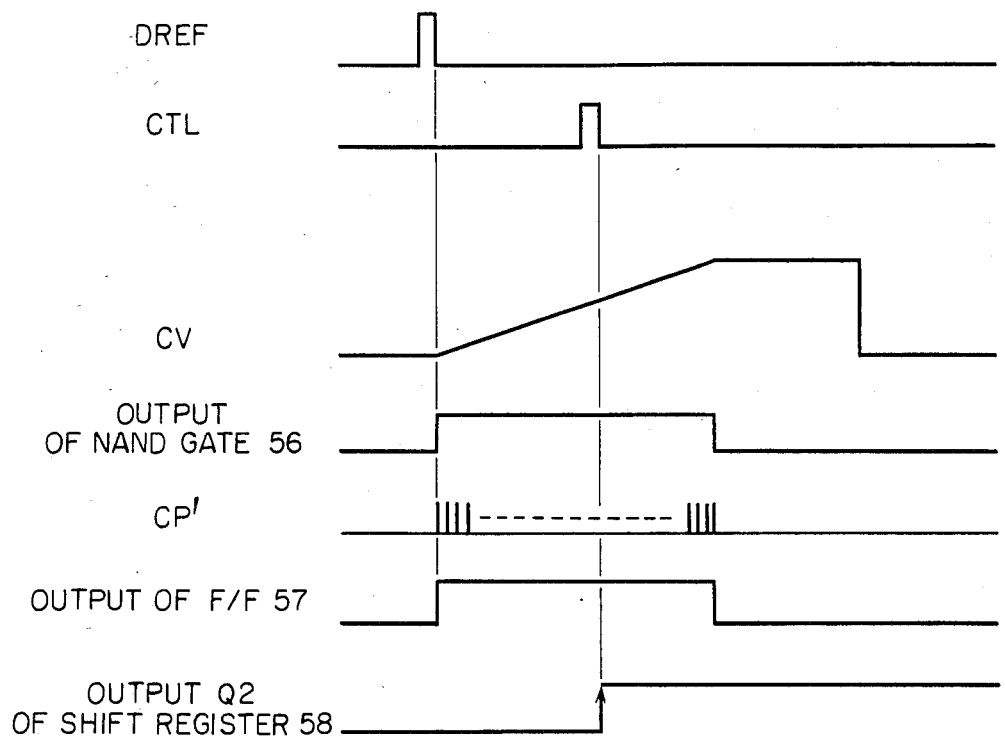
FIG. 18 is a diagram which is useful for explanation of the operation of the circuit of FIG. 17.

A practical circuit example of the phase synchronization detection circuit 44 and phase comparison control circuit 54 in this embodiment will now be explained with reference to FIGS. 17 and 18.

The phase comparison control circuit 54 will be first explained. This circuit operates on the basis of the operation principle which is essentially substantially the same as that of the phase comparison control circuit 6 used in the embodiment of FIG. 5 and shown in FIG. 15. In FIG. 17, the same parts and components as those shown in FIG. 15 are designated by the same reference numerals and the detailed descriptions are omitted. In FIG. 17, reference numeral 55 denotes an AND gate. On input of this AND gate is connected to the terminal 49 to which the clock pulse CP is supplied and the other input is connected to an output of a NAND gate 56. An output of the AND gate 55 is connected to the input terminal of the counter 50. An output of the counter 50 is connected to the input of the latch 51 similarly to the embodiment of FIG. 15, and at the same time it is also connected to an input of the NAND gate 56. The terminal 46 is connected to the reset input of the counter 50 similarly to FIG. 15.

In operation, when the delay reference signal DREF is supplied through the terminal 46 to the counter 50, the counter 50 is reset and its output becomes "0", so that an output of the NAND gate 56 becomes "1" and the AND gate 55 is opened. When the AND gate 55 is opened, the counter 50 starts counting a clock pulse (CP') supplied through the AND gate 55 and the count value is sequentially supplied to the latch 51. The count value when the control signal CTL is supplied to the latch 51 through the terminal 53 is latched by the latch 51. The output of the latch 51 is supplied to the D/A converter 52, by which it is converted to the analog signal having an analog value corresponding to the count value. This analog signal is supplied to the capstan motor 2 and controls this motor.

On the other hand, the counter 50 continues the counting operation until its outputs become all "1". In other words, when all of the outputs reach "1", the output of the NAND gate 56 becomes "0" and the AND gate 55 is closed, so that the supply of the clock pulse CP' to the counter 50 is stopped.

The phase synchronization detection circuit 44 will now be expalined. In FIG. 17, a set input of a flip-flop 57 is connected to the terminal 46 and a reset input is connected through an inverter 64 to the output of the NAND gate 56. An output of the flip-flop 57 is connected to D inputs of shift registers 58 to 61 connected in series. Each clock input terminal CK of the shift registers 58 to 61 is connected to the terminal 53, while each reset terminal R is connected to an output of the flip-flop 57 through an inverter 62. An output of the shift register 61 at the last stage is connected to the terminal 104 in FIG. 12.

The operation will now be described. In FIG. 18, the counter 50 is first reset due to the generation of the delay reference signal DREF and the output of the NAND gate 56 becomes "1" and the AND gate 55 is opened, so that the counter 50 starts counting the clock pulse CP' and the output $Q_1$ of the flip-flop 57 becomes a high level. The counter 50 increases a count value $CV^c$ until its outputs become all "1". When all outputs become "1", the output of the NAND gate 56 becomes "0" and the AND gate 55 is closed and the supply of the clock pulse CP' to the counter 50 is stopped. Also, the flip-flop 57 is reset and its output is returned to a low level. When the control signal CTL is generated during the counting operation of the counter 50, the signal CTL is used as a clock signal of the shift register 58; therefore, the output of the shift register 58 becomes high. This means that the control signal CTL is generated during a predetermined interval when the counter 50 is performing the counting operation after the generation of the delay reference signal, so that it is determined that the capstan motor 2 is rotating synchronously with the phase of the delay reference signal DREF. In this circuit example, in the case where the control signal CTL was continuously generated four times during a predetermined counting operation interval of the counter 50, it is determined that the synchronization is attained. Therefore, the four shift registers are connected.

The embodiment of FIG. 12 intends to solve the problem, particularly, in the rough search in the standard reproducing mode. However, in the case where a similar problem occurs during fine search or during search in the one-third-speed reproducing mode, this problem is also solved. Further, even in the case where the running state of the magnetic tape becomes unstable because the control signal CTL drops out or the like due to the dropout of the signal or the like, the searching operation is stopped during this signal dropout interval, so that the search result is not affected.

As described above, according to the present invention, the tracking phase at which the best tracking state is obtained is certainly set with a high degree of accuracy, and the time required to set such a tracking phase can be sufficiently reduced. It is possible to remarkably reduce the monitor-cut time at the start of the reproducing mode or upon switching between the reproducing modes. Also, since the whole circuit can be constituted as a digital circuit, the circuit arrangement can be produced as a small-sized and light-weighted IC. It is possible to provide an auto-tracking apparatus of a magnetic recording/reproducing apparatus having an excellent function by eliminating the drawbacks in the foregoing conventional technology.

While this invention has been described with reference to illustrative embodiments, this description is not intended to be construed in a limiting sense. Various modifications to the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. An auto-tracking apparatus which is used in a magnetic recording/reproducing apparatus of the helical scan system and which serves to control a rotation of a rotary cylinder and a run of a magnetic tape such that at least two magnetic heads attached to the rotary cylinder accurately scan tracks on the magnetic tape, comprising:

reference signal generating means for generating a reference signal;

rotary cylinder driving means for driving said rotary cylinder to rotate said magnetic heads synchronously with said reference signal;

head switching signal generating means for detecting a rotational phase of said rotary cylinder and outputting a head switching signal representative of said rotational phase;

envelope detecting means for sampling and detecting envelope levels of reproduced signals from said tracks detected by said magnetic heads at timings based on said head switching signal;

magnetic tape running means for allowing the magnetic tape to run in response to a tape running control signal which is inputted to said magnetic tape running means, said running means including tape running control means for controlling the run of said magnetic tape such that the magnetic tape runs at a phase having a phase difference corresponding to a delay time responsive to said reference signal of said running control signal with respect to the rotational phase of said rotary cylinder; and means for generating said tape running control signal on the basis of said detected envelope levels, reference signal and head switching signal, said means including: reference signal delay means, connected to receive said reference signal, for delaying said reference signal received and outputting the delayed reference signal as said tape running control signal; and delay control means, connected to said reference signal delay means, for controlling said reference signal delay means such that said reference signal delay means first changes the run of said magnetic tape at rough steps within a first predetermined tracking phase range on the basis of said head switching signal and said detected envelope levels and thereby detecting the roughly searched maximum envelope level of said reproduced signals, and after completion of the detection of said roughly searched maximum envelope level, changes the run of the magnetic tape at fine steps within a second predetermined tracking phase range which is narrower than said first predetermined tracking phase range and which includes the running phase of the magnetic tape corresponding to said roughly searched maximum envelope level to thereby detect the finely searched maximum envelope level of the reproduced signals and output a signal having the phase corresponding to said finely searched maximum envelope level as said tape running control signal.

2. An auto-tracking apparatus according to claim 1, wherein said reference signal delay means includes:

a monostable multivibrator for generating a first pulse of a desired fixed pulse width in response to the apply of said reference signal;

a generator of a clock signal; and means, connected to said clock signal generator and having a presettable counter of n bits including higher significant bits of predetermined digits and lower significant bits of predetermined digits, for taking in a preset data signal inputted to said n-bit counter in response to the trailing edge of said first pulse and also starting the counting operation of said clock signal from the initial count value designated by said preset data signal and for outputting a signal whose logic level changes when said counter value reaches said predetermined value as said running control signal, and wherein the sum of the pulse width of said first pulse and a period during which said presettable counter is performing the counting operation is said delay time.

3. An auto-tracking apparatus according to claim 2, wherein said delay control means includes:

counting means for counting a pulse representative of said head switching signal, said counting means including a first counter of the number of bits equal to said predetermined number of digits of said higher significant bits and a second counter of the number of bits equal to said predetermined number of digits of said lower significant bits, and outputs of said first and second counters being connected to corresponding inputs of said presettable counter;

memory means for storing the content of said counting means;

data memory means, connected to said envelope detecting means, for temporarily storing the first envelope level detected;

data comparing means, connected to said envelope level detecting means and said data memory means, for comparing said first envelope level with the second envelope level detected next to the first envelope level and outputting a signal to instruct to update the content of said data memory means by said second envelope level and to write the content of said counting means into said counter memory means when said second envelope level is larger than said first envelope level on the basis of the result of said comparison; and searching speed control means for controlling in such a manner as to: reset the contents of said first and second counters in response to a search-start signal to instruct the start of the auto-tracking; set said data memory means into the writable state; set said first counter into the uncountable state; set said second counter into the writable state; set the first counter into the uncountable state after said head switching signal was counted a first predetermined number of times; read out the value held in said counter memory; store a predetermined value corresponding to said value read out into the first counter; set said second counter into the countable state; set the second counter into the unwritable state after the head switching signal was counted a second predetermined number of times; and update the second counter by the content of the counter memory.

4. An auto-tracking apparatus according to claim 3, wherein an output pulse of said monostable multivibrator is set to a pulse width corresponding to the tracking phase at which an envelope level near said minimum envelope level of the reproduced signals is obtained, and said predetermined value corresponding to said read value is the value held in said counter memory minus 1.

5. An auto-tracking apparatus according to claim 3, wherein an output pulse of said monostable multivibrator is set to a pulse width corresponding to the tracking phase at which an envelope level near said maximum envelope level of the reproduced signals is obtained, and the predetermined value relative to said read value is equal to the value held in said counter memory.

6. An auto-tracking apparatus according to claim 1, wherein said magnetic tape running means includes:
means for detecting the control signal representative of the tape running phase recorded on said magnetic tape, and
phase comparison control means for comparing the phases of said tape running control signal and of said control signal and controlling said magnetic tape running means on the basis of the result of said comparison, and
said auto-tracking apparatus further includes phase synchronization detection means for stopping the operation of said delay control means on the basis of said control signal and said tape running control signal when it is detected that said tape is not synchronized with said tape running control signal.

7. An auto-tracking apparatus of a magnetic recording/reproducing apparatus of the helical scan system in which a run of a magnetic tape is controlled by a signal representative of a phase difference between a reference signal and a signal indicative of a running phase of said magnetic tape, comprising:
first means for delaying said reference signal;
a second means for periodically detecting an envelope level of a frequency modulated video signal reproduced by a rotary head;
third means for sequentially changing a delay time of said first means at a rough pitch within a predetermined first range each time said second means detects said envelope level so as to detect a first delay time of said first means such that said envelope level becomes maximum; and
fourth means for sequentially changing the delay time of said first means at a fine pitch within a predetermined second range including said first delay time detected by said third means each time said second means detects said envelope level so as to detect a second delay time of said first means such that said envelope level becomes maximum,
wherein by delaying said reference signal by setting said second delay time into said first means, the phase of said reference signal is accurately and rapidly to thereby obtain the best tracking state.

8. An auto-tracking apparatus according to claim 7, wherein said third means starts the operation from the state in that said envelope level is near the maximum level.

9. An auto-tracking method for controlling a run of a magnetic tape in a magnetic recording/reproducing apparatus of a helical scan type so that rotary magnetic heads accurately scan tracks on the magnetic tape, comprising the steps of:
changing the running phase of said tape at rough steps over a first predetermined tracking phase for detecting a first maximum envelope level of a reproduced signal recorded on said tape;
changing the running phase of said tape at fine steps over a second predetermined tracking phase range which is narrower than the first range and extends around a tracking phase corresponding to said first maximum envelope level, for detecting a second maximum envelope level of said reproduced signal; and
setting the running phase of said tape to a value corresponding to said second maximum envelope level.

* * * * *